US008976956B2

(12) United States Patent
Michaelis et al.

(10) Patent No.: US 8,976,956 B2
(45) Date of Patent: Mar. 10, 2015

(54) SPEAKER PHONE NOISE SUPPRESSION METHOD AND APPARATUS (71) Applicant: Avaya Inc., Basking Ridge, NJ (US)

(72) Inventors: Paul Roller Michaelis, Louisville, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/676,632

(22) Filed: Nov. 14, 2012

(65) Prior Publication Data
US 2014/0133647 A1    May 15, 2014

(51) Int. Cl.
H04M 1/00 (2006.01)
H04B 1/38 (2006.01)
H04M 9/04 (2006.01)
G10L 21/0208 (2013.01)
H04R 3/00 (2006.01)
H04R 3/02 (2006.01)
G10L 21/0224 (2013.01)

(52) U.S. Cl.
CPC ............ *H04M 9/04* (2013.01); *G10L 21/0208* (2013.01); *H04R 3/005* (2013.01); *H04R 3/02* (2013.01); *H04M 2250/12* (2013.01); *G10L 21/0224* (2013.01)
USPC ..................................... 379/392.01; 455/570

(58) Field of Classification Search
None
See application file for complete search history.

(56) References Cited

U.S. PATENT DOCUMENTS

| 4,442,323 | A | 4/1984 | Yoshida et al. |
| 6,212,275 | B1 | 4/2001 | Akhteruzzaman |
| 7,010,118 | B2* | 3/2006 | Etter ........................ 379/392.01 |
| 7,031,448 | B2 | 4/2006 | Coffman et al. |
| 7,724,892 | B2 | 5/2010 | Dedieu et al. |
| 2005/0053244 | A1* | 3/2005 | Onishi et al. ................ 381/71.11 |
| 2005/0063553 | A1 | 3/2005 | Ozawa |
| 2005/0234715 | A1* | 10/2005 | Ozawa .......................... 704/226 |
| 2007/0041588 | A1* | 2/2007 | Lin .............................. 381/71.1 |
| 2013/0208923 | A1* | 8/2013 | Suvanto ........................ 381/122 |
| 2013/0262101 | A1* | 10/2013 | Srinivasan .................... 704/226 |

* cited by examiner

*Primary Examiner* — Fan Tsang
*Assistant Examiner* — Jeffrey Lytle
(74) *Attorney, Agent, or Firm* — Sheridan Ross P.C.

(57) ABSTRACT

Systems and methods for removing noise from an audible signal are provided. More particularly, a vibration sensor is used to obtain a vibration signal from an environment including a communication device. The signal from the vibration sensor is combined with a signal from a microphone associated with the communication device, to create a modified audible signal. More particularly, a filtering or subtraction process can be performed with respect to the audible signal, at a time corresponding to an event detected as part of the vibration signal. The resulting modified audible signal can have reduced noise as compared to the original audible signal.

20 Claims, 5 Drawing Sheets

SPEAKER PHONE NOISE SUPPRESSION METHOD AND APPARATUS

FIELD

Systems and methods for suppressing noise in an audible signal are provided. More particularly, methods and systems for removing noise associated with a vibration from an audible signal are provided.

BACKGROUND

Speaker phones are commonly used to provide a user with a hands free communication device, and/or to enable multiple users at an endpoint to participate in a call. A well known problem with the tabletop speakerphones commonly used in conference rooms is that, in addition to the talker's speech, non-speech noise in the conference room may be picked up by the speakerphone's microphone and transmitted to the other parties on the call. In many cases, the noises are associated with, or caused by, physical contact with the table or surface on which the speakerphone has been placed. Examples can include people tapping their fingers on the table, typing on a keyboard that is on the table, bumping into the table, and placing or moving objects on the table.

In order to address the problem of noise generated from activity in the environment of a speakerphone, various techniques have been developed. For example, specialized microphone arrays and sophisticated digital signal processing techniques can be applied. Some of the commonly used approaches attempt to distinguish between signal and noise by relying on sound localization assessments. In particular, they attempt to collect audio originating from a specific physical location associated with the source of the signal, while filtering out sounds coming from other locations. Other techniques attempt to distinguish between human voice and non-voice sounds. Accordingly, such techniques have been oriented towards airborne sounds.

SUMMARY

Systems and methods for suppressing noise in an audible signal are provided. More particularly, the inventors have recognized that many distracting sounds picked up by a speakerphone are associated with, or caused by, physical contact with the table or surface on which the speakerphone has been placed. Accordingly, these sounds are often associated with an identifiable physical vibration in the table or surface. Embodiments of the present disclosure utilize vibration sensors to help identify sounds associated with physical contact with the table or surface. Information provided by the vibration sensor is used by a filter to subtract, attenuate, filter or otherwise reduce the noise component of an audible signal comprising speech. In accordance with at least some embodiments of the present disclosure, the filter may be implemented by a processor executing application programming or code. In accordance with still other embodiments of the present disclosure, the filter may be implemented as a circuit that subtracts at least a portion of the vibration signal from the audible signal.

Systems in accordance with embodiments of the present disclosure include a communication device that includes or is associated with one or more microphones. The microphone is operative to produce an audible signal from sounds collected in the surrounding environment. The system further includes one or more vibration sensors. The vibration sensor can be placed on a surface supporting the microphone, either directly or through an intermediate structure. The audible signal and the vibration signal are provided to a filter. The filter applies the vibration signal to the audible signal, to remove components of the audible signal associated with the vibration signal, thereby creating a modified audible signal. The filter may be implemented by a processor executing application programming or code. The filter may also be implemented as a circuit or other hardware.

Methods in accordance with embodiments of the present disclosure include receiving audible information at one or more microphones, which provide an audible signal output. The method additionally includes receiving vibration information at one or more vibration sensors that provide a vibration signal output. Moreover, the vibration sensor may be placed on a surface within an environment that includes the microphone. More particularly, a vibration sensor may be placed such that it is in contact with a surface, such as a table, shelf, or other support surface, on which the microphone is also placed. Signals from the microphone and from the vibration sensor are provided as inputs to a filter. The method further includes creating a modified audible signal by removing components of the audible signal collected by the microphone that correspond to the vibration signal collected by the vibration sensor.

Additional features and advantages of embodiments of the present disclosure will become more readily apparent from the following description, particularly when taken together with the accompanying drawings.

DETAILED DESCRIPTION

Figure 1:
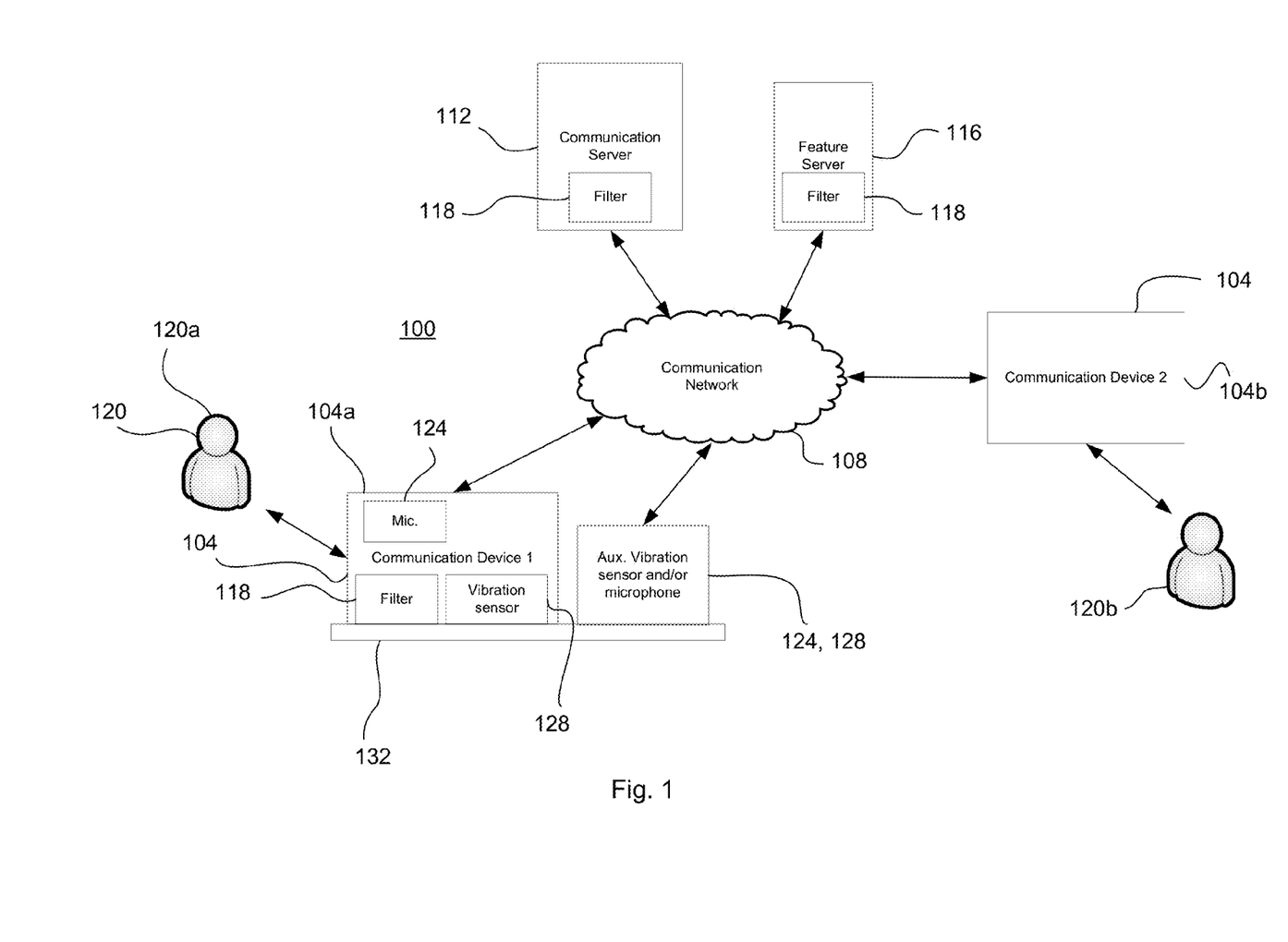
FIG. 1 illustrates components of a communication system in accordance with embodiments of the present disclosure.

FIG. 1 illustrates components of a communication system 100 with noise suppression features in accordance with embodiments of the present disclosure. The communication system 100 generally includes one or more communication devices 104, a communication network 108, a communication server 112, and/or a feature server 116. The system provides a filter 118, which can be implemented by or in association with various components, alone or in combination, such as a communication device 104, communication server 112, and/or features server 116. As can be appreciated by one of skill in the art, a communication device 104 may be associated with a user 120.

In accordance with embodiments of the present disclosure, at least one communication device 104*a* includes or is associated with one or more microphones 124. In addition, the at least one communication device 104*a* includes or is associated with one or more vibration sensors 128. For example, a vibration sensor 128 may be provided as part of the communication device 104*a* itself. Alternatively or in addition, an auxiliary vibration sensor 128 may be provided that is physically separate from the communication device 104*a*. In accordance with still other embodiments, a microphone 124 and/or a vibration sensor can be provided as part of a remote sensor that is interconnected to an associated communication device 104a, and that provides input to a filter as described herein alone or in combination with a microphone 124 and/or vibration sensor 128 included in the communication device 104a itself.

In accordance with at least some embodiments of the present disclosure, at least the first communication device 104a is placed on a support surface 132. As examples, but without limitation, the support surface 132 can include a table, desk, shelf, wall or other structure on which the communication device 104a can be placed or to which the communication device 104a can be mounted. Whether provided as part of the first communication device 104a or as a separate component of the system 100, the vibration sensor 128 can also be placed on the support surface 132. As can be appreciated by one of skill in the art after consideration of the present disclosure, by placing the vibration sensor 128 on the same support surface 132 on which the first communication device 104a is placed, the vibration sensor 128 can detect vibrations that affect or that might affect the audible signal collected by the microphone 124 associated with the first communication device 104a.

A communication device 104 in accordance with embodiments of the present disclosure can comprise any communication device or endpoint capable of supporting audible (e.g., voice) communications in associated with one or more users 120. A communication device 104 as described herein can also include a filter 118. Moreover, in accordance with embodiments of the present disclosure, at least the first communication device 104a may comprise a speakerphone, or a device that supports a speakerphone function. Accordingly, a communication device 104 may comprise a telephone, a speakerphone, a conference room communication system, a cellular telephone, a soft phone, or the like. Moreover, a communication device 104 can support communications other than audible communications. For example, a communication device 104 can provide video phone, instant messaging, short message system, email, or other communication capabilities.

A communication device 104 is generally capable of communicating with another communication device 104, and/or with other communication devices or server devices, including but not limited to a communication server 112 and/or a feature server 116, across the communication network 108. The communication network 108 may comprise a packet data network, such as a local area network (LAN), and/or a wide area network (WAN). Alternatively or in addition, the communication network 108 may comprise a dedicated connection between two or more communication devices 104. In accordance with still other embodiments, the communication network 108 may comprise a circuit based communication network, such as the public switched telephony network (PSTN). Furthermore, the communication network 108 may include any number of individual networks or different network types in various configurations. Moreover, the communication network 108 can use a variety of protocols, alone or in combination, such as Ethernet, Internet protocol (IP), session initiation protocol (SIP), integrated services digital network (ISDN), and the like.

The communication server 112 may comprise a general purpose computer or server capable of providing various services or functions in connection with the operation of one or more communication devices 104. For example, the communication server 112 may include a filter 118. In an exemplary embodiment, the communication server 112 may comprise an enterprise telecommunications server providing conference bridge, private branch exchange (PBX), sequenced application, automatic speech recognition (ASR), interactive voice response (IVR), or other services. In accordance with at least some embodiments of the present disclosure, the communication server 112 may provide filter or noise suppression features as described herein. Likewise, a feature server 116, if provided, may comprise a general purpose computer, server, or a limited feature device that is capable of providing various services or functions in connection with the operation of one or more of the communication devices 104. Such services or functions can include the provision of filter 118 with noise suppression capabilities as described herein.

In general, the communication system 100 supports communications between users 120 at different communication devices 104, and/or between one or more users 120 associated with at least a first communication device 104a and a service or feature provided by a server 112 or 116, or other component. Moreover, the communication system 100 can provide a modified audible signal, where the modification includes the attenuation of a noise signal from an audible signal collected by a microphone 124 as described herein. In general, a noise signal obtained by a vibration sensor 128 is used to attenuate the appearance of that noise signal in an audible signal collected by a microphone 124. The attenuation or subtraction can be performed at various points within the communication system 100. For example, subtraction can be performed within a communication device 104, a communication server 112, or a feature server 116. Moreover, the attenuation of a noise signal associated with a vibration signal from an audible signal can be performed by hardware, software, or a combination of hardware and software.

Figure 2:
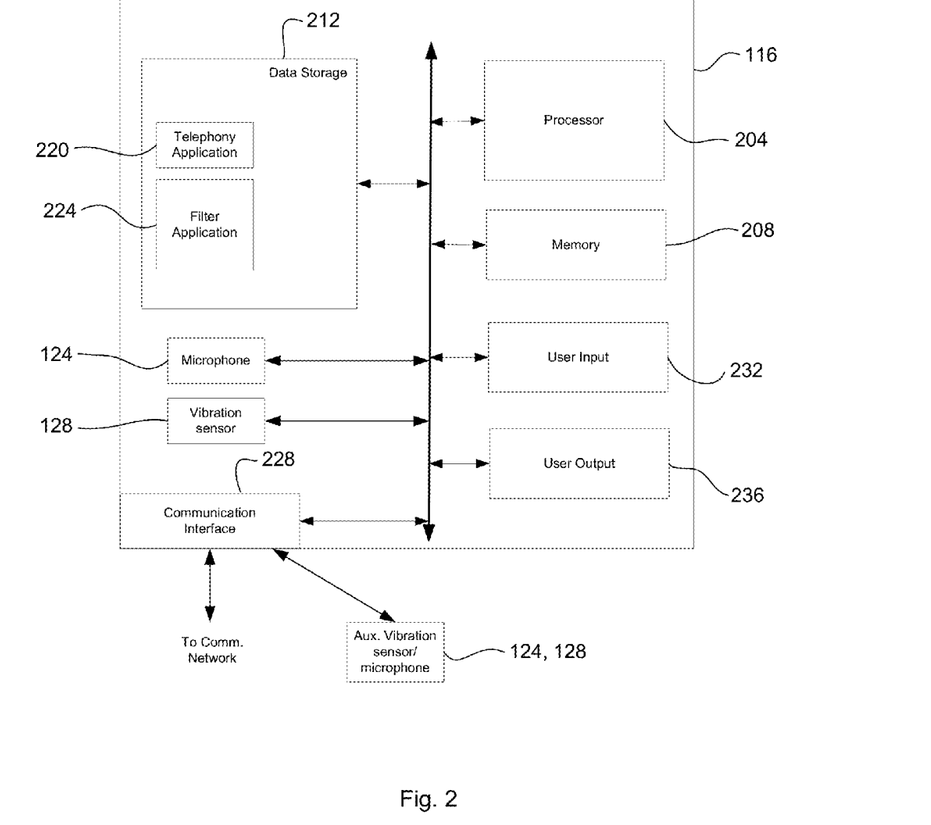
FIG. 2 depicts components of a device incorporating noise suppression features in accordance with embodiments of the present disclosure.

FIG. 2 illustrates components of a communication device 104, communication server 112, and/or feature server 116 that may be associated with a communication system 100 in accordance with embodiments of the present disclosure. More particularly, features of a communication device 104, a communication server 112, or a feature server 116 that operates to provide noise suppression as described herein are illustrated. In general, the device 104, 112, or 116 can include components of a conventional computing device. Accordingly, a processor 204 capable of executing program instructions can be provided. The processor 204 may include any general purpose programmable processor or controller for executing application programming or instructions. Alternatively, the processor 204 may comprise a specially configured application specific integrated circuit (ASIC). The processor 204 generally operates to run programming code implementing various functions performed by the associated device 104, 112, or 116, including but not limited to a noise suppression feature.

The device 104, 112, or 116 also includes memory 208. The memory 208 can be used in connection with the execution of programming by the processor 204, and for the temporary or long term storage of data and/or program instructions. As examples, the memory 208 may comprise a computer readable medium, such as RAM, SDRAM, or other solid state memory. Alternatively or in addition, data storage 212 may be provided. In accordance with embodiments of the present invention, the data storage 212 can contain application programming or instructions implementing various of the applications or functions executed or performed by the associated device 104, 112, or 116. Like the memory 208, the data storage 212 may comprise a computer readable memory, such as RAM, SDRAM, or other solid state memory. Alternatively or in addition, the data storage 212 may comprise a computer readable medium, such a hard disk drive or other random access memory. Moreover, memory 208 or data storage 212 may comprise a non-transitory computer readable medium.

In accordance with embodiments of the present disclosure, the data storage 212 can include various applications and data. For example, when associated with a communication device 104, the data storage 212 can include a telephony application 220, to support real time communications between the communication device 104, and other communication devices 104 or nodes (e.g., servers 112 and/or 116) that may be included within a communication system 100. In the case of a communication server 112 or feature server 116, a telephony application 220 comprising support for various telephony applications executed in connection with one or more communication devices 104 within the communication system 100 may be provided. As another example, a filter application 224 can be provided. The filter application 224 operates to implement a filter 118 as described herein that applies a vibration signal obtained by a vibration sensor 128 to an audible signal obtained by a microphone 124 to remove noise from the audible signal, thereby creating a modified audible signal. The filter application 224 can be included in any of the communication device 104, the communication server 112, and/or the feature server 116.

The device 104, 112, or 116, also includes or is associated with a microphone 124 and a vibration sensor 128. More particularly, in the case of a communication device 104, a microphone 124 and a vibration sensor 128 can be integral to that device 104. Alternatively or in addition, a separately provided microphone 124 and/or vibration sensor 128 may be interconnected to the device 104. For example, a microphone 124 and/or a vibration sensor 128 can be provided as a remote unit that is interconnected to the communication device 104 through a wired or wireless interconnection. With respect to a communication 112 or feature 116 server, the microphone 124 and the vibration sensor 128 may be interconnected to the associated server 112 or 116 through the communication network 108. More particularly, the microphone 124 and the vibration sensor 128 are located in the vicinity of a user 120, in order to perform their functions of receiving audible signals in the form of speech (in the case of a microphone 124), and noise in the form of vibrations (in the case of the vibration sensor 128). The microphone 124 and/or vibration sensor 128 can be interconnected to an internal communication bus included in the device, for example where the microphone 124 and vibration sensor 128 are integral to the communication device 104. For a microphone 124 or vibration sensor 128 that is remote with respect to the device 104, 112 or 116, the interconnection may be through the communication network 108, and/or a communication interface 228. In accordance with still other embodiments, multiple microphones 124 and/or vibration sensors 128 can be utilized. For example, arrays of microphones 124 and/or vibration sensors 128 can be used to provide signals to a filter 118.

The device 104, 112 or 116 can also include various user input devices 232 and/or user output devices 236. Examples of user input devices 232 include a keyboard, camera, touch screen display, mouse, or other position encoder, etc. In addition, a microphone 124 and a vibration sensor 128 are particular examples of input devices 232. Examples of user output devices 236 include a display, speaker, indicator lamp, etc.

The communication interface 228 can operate to interconnect an associated device 104, 112, or 116 to the communication network 108, and/or to one or more other devices 104, 112, or 116, or other system components. Examples of a communication interface 228 include a wired Ethernet interface, a wireless Internet interface, such as a Wi-Fi or IEEE 802.11 interface, Bluetooth, USB, or the like.

Figure 3:
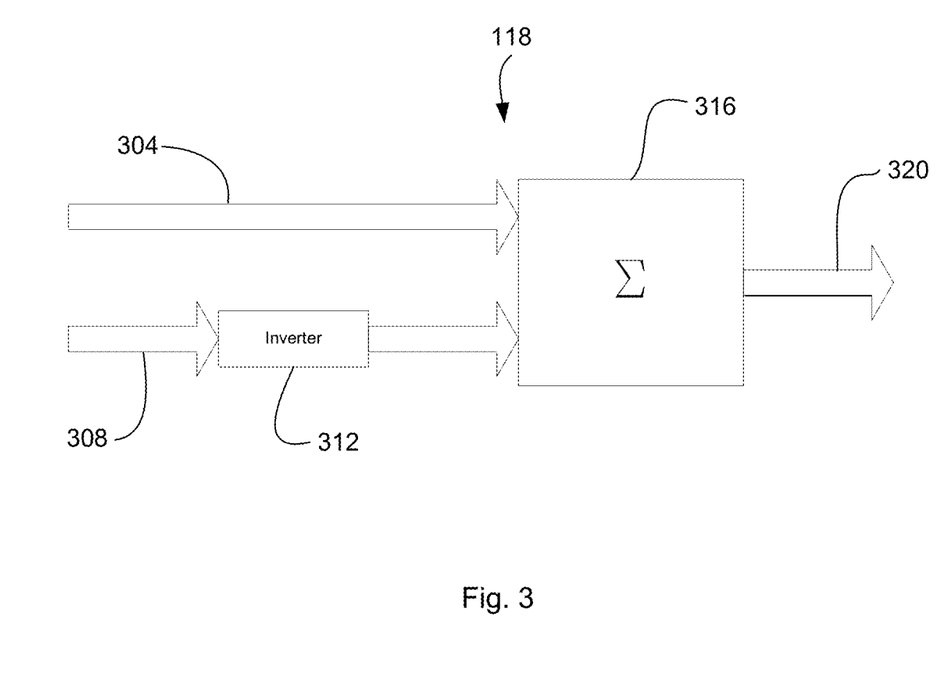
FIG. 3 depicts a filter implemented in hardware in accordance with embodiments of the present invention.

With reference now to FIG. 3, a filter 118 in accordance with further embodiments of the present disclosure is illustrated. In this embodiment, unlike other embodiments in which the filter 118 is implemented as software, and in particular through the provision of a filter application 224 and supporting processor 204 and memory 208 facilities, this alternate embodiment is implemented as hardware. More particularly, the filter 118 in this embodiments includes a first input 304 that receives an audible signal from a microphone 124, and a second input 308 that receives a vibration signal input from a vibration sensor 128. The filter 118 additionally includes an inverter 312, that inverts the signal received from the vibration sensor 128. The audible signal and the inverted vibration signal are combined at a summer or combiner 316. The output from the summer 316 is a modified audible signal 320. As can be appreciated by one of skill in the art after consideration of the present disclosure, various modifications and/or additions to the example filter 118 circuit illustrated in FIG. 3 can be created in accordance with the present disclosure.

Figure 4:
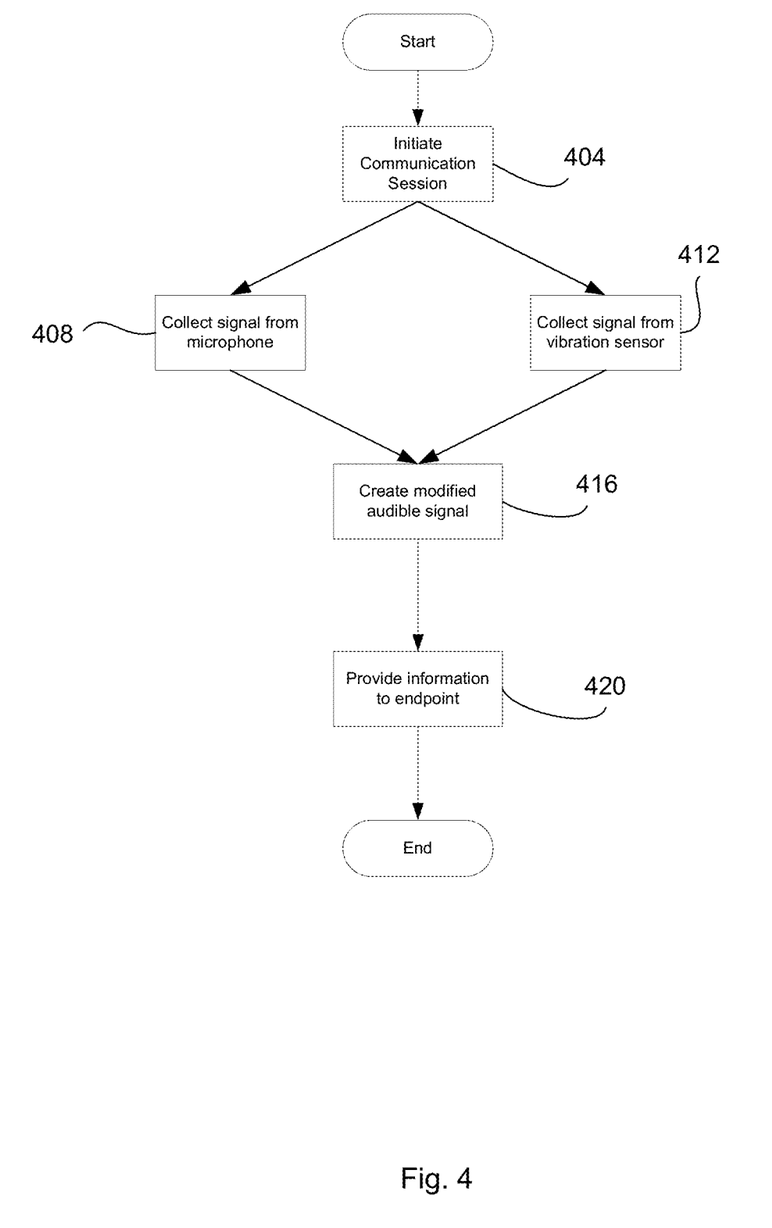
FIG. 4 is a flowchart depicting aspects of a method in accordance with embodiments of the present disclosure.

With reference now to FIG. 4, aspects of the operation of a system 100 in accordance with embodiments of the present disclosure are illustrated. At step 404, a communication session is initiated. Initiation of a communication session can include establishing a communication channel between a communication device 104 and another system 100 device or server 104, 112, or 116. In addition, in accordance with embodiments of the present disclosure, initiating a communication session can include placing a microphone 124 and a vibration sensor 128 in an operational condition. Following the initiation of a communication session, an audible signal is collected from a microphone 124 associated with the first communication device 104a (step 408). In addition, at step 412, a signal from a vibration sensor 128 associated with the first communication 104a is collected. Moreover, the collection of audible signals by a microphone 124 and of vibration signals by a vibration sensor 128 are performed simultaneously.

At step 416, the signals collected by the microphone 124 and the vibration sensor 128 are combined to create a modified audible signal. More particularly, the audible signal and the vibration signal can be provided as inputs to the filter 118. For example, the audible signal obtained by the microphone 124 and the vibration signal obtained by the vibration sensor 128 can be provided to the device 104, 112, or 116 executing the filter application 224. The filter application 224 then produces a modified audible signal. In general, the modified audible signal includes the original audible signal collected by the microphone 124, with modifications to remove portions of the original audible signal that contain noise, as indicated by the signal from the vibration sensor 128. For example, a smoothing and/or subtraction process can be performed with respect to the original audible signal, at locations in that signal corresponding in time to signals received at the vibration sensor 128. This subtraction or filtering can be performed through the execution of the filter application 224. In accordance with still other embodiments, instead of performing filtering or subtraction using a software solution in the form of a filter application 224, a filter 118 implemented as hardware may be provided. For example, a filter 118 implemented in hardware as shown in FIG. 3 creates an inverse of a signal collected by the vibration signal 128, and adds the inverted vibration signal to the original audible signal obtained by the microphone 124 to create a modified audible signal.

At step 420, the modified audible signal can be passed to a target device or endpoint 104, 112, or 116. Because the modified audible signal has had noise in the form of signals detected by the vibration sensor 128 removed, the modified audible signal has reduced noise as compared to the audible signal originally collected by the microphone 124.

Figure 5:
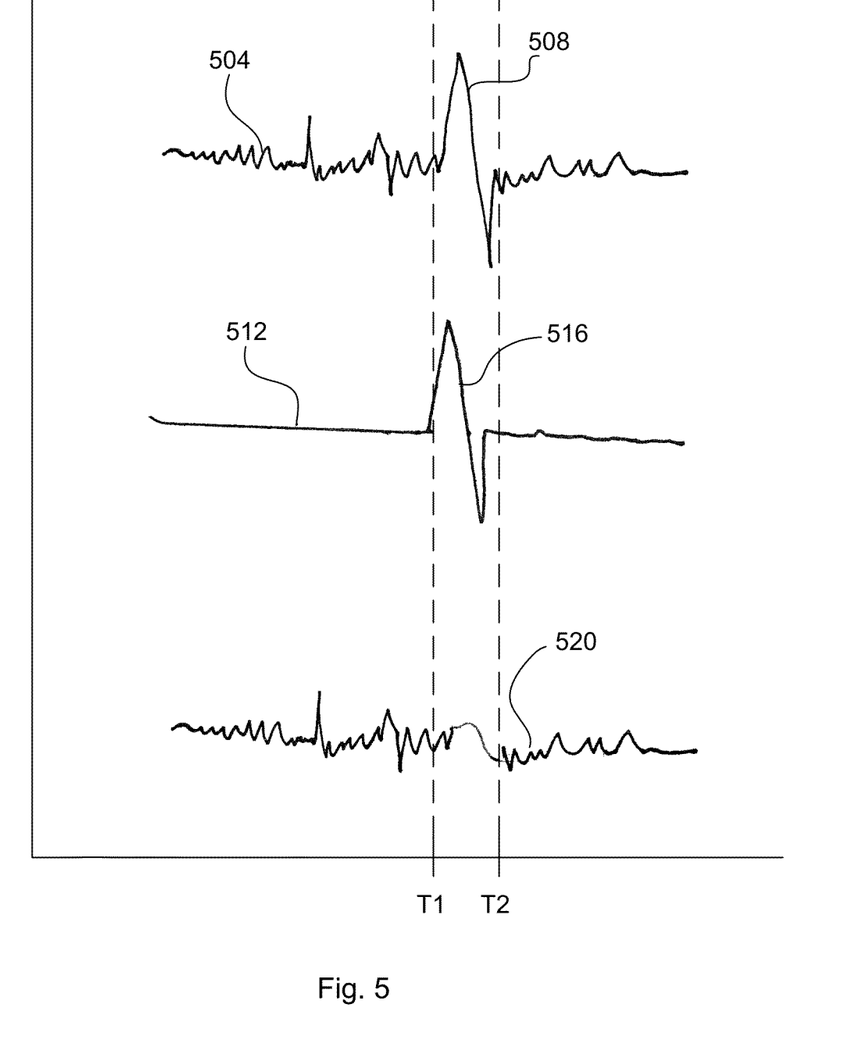
FIG. 5 depicts signals associated with a system in accordance with embodiments of the present disclosure.

With reference now to FIG. 5, signals associated with a signal 100 in accordance with embodiments of the present disclosure are depicted. In particular, various signals over a common time scale are depicted. The first signal 504 depicts an audible signal. The audible signal 504 includes a noise event 508 at time T1 to T2. A second example signal 512 depicts a vibration signal. The vibration signal 512 includes a vibration event 516. The vibration event 516 corresponds to the noise event 508, and therefore also occurs within the time period T1 to T2. A filter 118, whether implemented as software through execution of a filter application 224 or as hardware, can utilize the vibration signal 512 to remove noise from the audible signal 404. For example, as described elsewhere herein, the vibration signal 512 can be subtracted from the audible signal 504. The third signal 520 depicted in the figure is a modified audible signal. The modified audible signal 520 represents the audible signal 504, after the vibration signal 512 (or at least the vibration event 516 portion where the vibration signal has some minimum amplitude) has been subtracted. As depicted in the figure, the noise event 508 present in the original audible signal 504 has largely been removed from the modified audible signal 520. Accordingly, noise cancellation has been achieved. Moreover, such noise cancellation is achieved through the use of an input from a vibration sensor 128.

Although various example configurations and embodiments have been described herein, other arrangements in accordance with embodiments of the present disclosure are possible. For example, arrays of microphones 124 and/or vibration sensors 128 may be utilized. Moreover, where information regarding a location at which an audible signal and/or a vibration signal originated is available, such information can be used to selectively apply noise cancellation. Moreover, a filter 118 as described herein can be provided as part of a communication device 104, a communication server 112, or a feature server 116. In accordance with still other embodiments, a filter 118 can be implemented as a stand alone device, for example as a device interposed between a communication device 104 and a communication network 108, between a microphone 124 and a communication device 104, etc.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A communication system, comprising:
a first microphone in a first communication device;
a second microphone in a second communication device;
a plurality of vibration sensors comprising at least a first vibration sensor in the first communication device and at least a second vibration sensor in the second communication device; and
a filter, wherein a plurality of vibration signals from the plurality of vibration sensors are received at the filter, wherein a first audible signal from the first microphone and a second audible signal from the second microphone are received at the filter, wherein the filter applies the plurality of vibration signals from the plurality of vibration sensors to modify the audible signals from the first microphone and the second microphone, and wherein the filter outputs a modified audible signal.

2. The system of claim 1, further comprising:
a processor, wherein the filter is implemented through the execution of a filter application by the processor.

3. The system of claim 2, further comprising:
memory, wherein the filter application is stored in the memory.

4. The system of claim 2, wherein the plurality of vibration signals are subtracted from the first and second audible signals.

5. The system of claim 2, wherein a portion of the plurality of vibration signals having at least a first component within an audible frequency is subtracted from the first and second audible signals.

6. The system of claim 2, wherein the plurality of vibration signals provide timing information to the filter application that is used by the filter application to remove noise associated with the plurality of vibration signals from the first and second audible signals.

7. The system of claim 1, further comprising:
a combiner, wherein the filter includes the combiner, and wherein the plurality of vibration signals are subtracted from the first and second audible signals by the combiner.

8. The system of claim 1, further comprising:
a communication interface, wherein the modified audible signal is provided from the filter to the communication interface.

9. The system of claim 8,
wherein the communication interface, is provided by the first communication device.

10. The system of claim 9, wherein the filter is provided by the first communication device.

11. The system of claim 1, wherein the at least first vibration sensor is in physical contact with first support surface, wherein the at least second vibration sensor is in physical contact with a second support surface, and wherein the first support surface and the second support surface are in contact with an intermediate structure.

12. A method of removing non-speech noise from a plurality of audible signals, comprising:
receiving a first audible signal at a first microphone in a first communication device;
receiving a second audible signal at a second microphone in a second communication device;
receiving a plurality of vibration signals at a plurality of vibration sensors comprising at least a first vibration sensor in the first communication device and at least a second vibration sensor in the second communication device;

providing the first and second audible signals and the plurality of vibration signals to a filter;
modifying, in the filter, the first and second audible signals by applying the plurality of vibration signals to create a modified audible signal; and
outputting from the filter the modified audible signal.

13. The method of claim 12, wherein modifying the first and second audible signals includes subtracting the plurality of vibration signals from the first and second audible signals.

14. The method of claim 12, wherein modifying the first and second audible signals includes subtracting at least a first range of frequencies from the first and second audible signals at a time corresponding to the plurality of vibration signals.

15. The method of claim 12, wherein the plurality of vibration sensors are in physical contact with a plurality of support surfaces, and wherein the plurality of vibration signals includes a plurality of vibrations in the plurality of support surfaces.

16. The method of claim 15, wherein the plurality of vibration sensors are in physical contact with the plurality of support surfaces through an intermediate structure.

17. The method of claim 15, wherein a portion of the plurality of vibration signals having at least a first component within an audible frequency is subtracted from the first and second audible signals.

18. A non-transitory computer readable medium having stored thereon computer executable instructions, the computer executable instructions causing a processor to execute a method for removing non-speech noise from a plurality of audible signals, the computer executable instructions comprising:
instructions to receive a first audible signal from a first microphone in a first communication device;
instructions to receive a second audible signal from a second microphone in a second communication device;
instructions to identify a plurality of non-speech signals received from a plurality of vibration sensors comprising at least a first vibration sensor in the first communication device and at least a second vibration sensor in the second communication device; and
instructions to modify the first and second audible signals to remove at least a first portion of the first and second audible signals corresponding to the identified plurality of non-speech signals received from the plurality of vibration sensors.

19. The non-transitory computer readable medium of claim 18, wherein the first and second audible signals are modified by subtracting at least an audible frequency included in the plurality of non-speech signals from the first and audible signals.

20. The non-transitory computer readable medium of claim 18, wherein the first and second audible signals are modified by subtracting a waveform corresponding to the plurality of non-speech signals from the first and second audible signals.

* * * * *